W. J. RICHARDSON.
GRASS COLLECTOR FOR LAWN MOWERS.
APPLICATION FILED MAR. 10, 1910.
997,327.
Patented July 11, 1911.
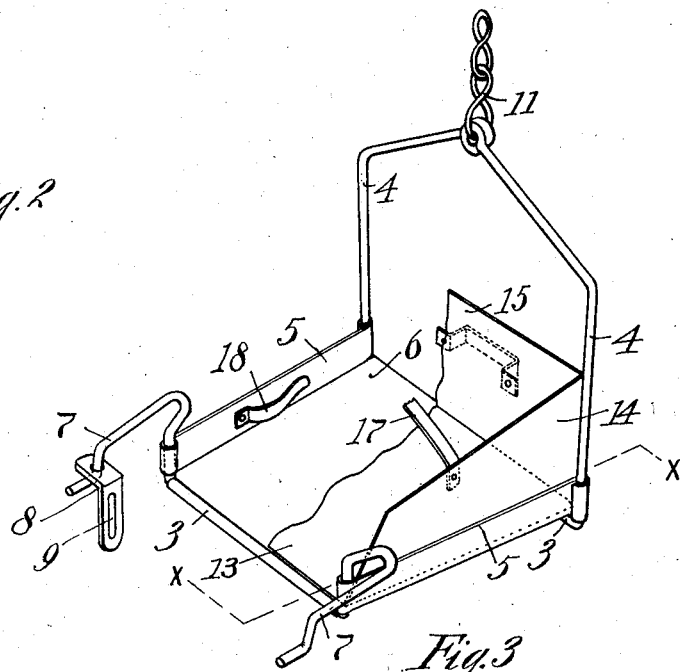
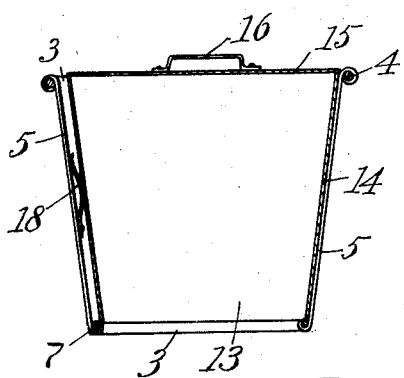
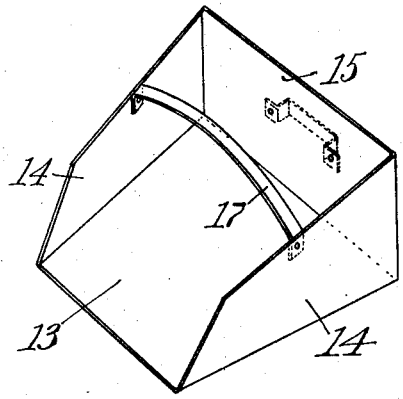
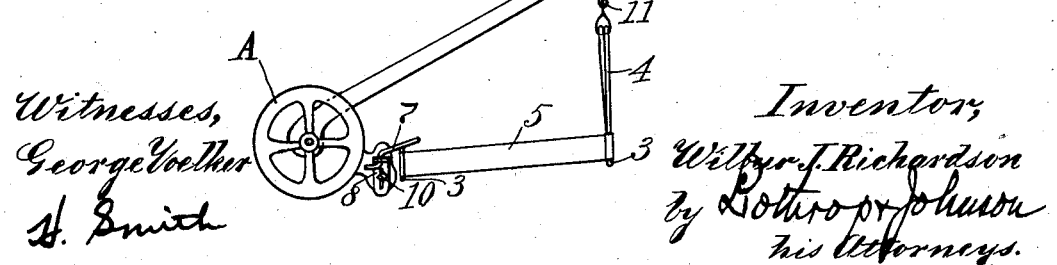

UNITED STATES PATENT OFFICE.

WILBUR J. RICHARDSON, OF LAKE CITY, MINNESOTA.

GRASS-COLLECTOR FOR LAWN-MOWERS.

997,327. Specification of Letters Patent. Patented July 11, 1911.

Application filed March 10, 1910. Serial No. 548,427.

*To all whom it may concern:*

Be it known that I, WILBUR J. RICHARDSON, a citizen of the United States, residing at Lake City, in the county of Wabasha and State of Minnesota, have invented certain new and useful Improvements in Grass-Collectors for Lawn-Mowers, of which the following is a specification.

My invention relates to improvements in grass collectors for lawn mowers, and has for its object to provide improved means removable from the lawn mower for catching and removing the cut grass.

To this end the invention consists in the construction, combination and arrangement of parts hereinafter particularly described and claimed.

In the accompanying drawings forming part of this specification Figure 1 is a diagrammatic side view of a lawn mower with my improved collector attached thereto; Fig. 2 is a perspective view of the collector alone, with some parts broken away; Fig. 3 is a perspective view of the pan or receptacle; and Fig. 4 is a horizontal section on line *x—x* of Fig. 2.

As shown in the drawings, A represents the frame of a lawn mower of usual construction upon which is pivotally supported an operating handle B which may be adjusted at different heights according to the needs of the operator or the requirements of the work in hand.

The improved collector comprises a skeleton frame having transverse front and rear cross-bars 3 connected by sheet metal side members 5. The cross-bars are bent up vertically at the ends to receive the side members 5 which are wrapped about these upturned ends of the cross-bars. The frame is also provided with a sheet metal bottom 6 extending from the rear cross-bar to the front cross-bar to form a long slide and support for the collector pan 13 hereinafter described. The bottom 6 is shown in the drawings bent up over the front of the forward cross-bar 3.

The upturned ends of the front cross-bar 3 are bent forwardly to form bent arms 7 which pass freely through holes in the horizontal members of the brackets 8, which are pivotally and adjustably secured to the lawn mower frame. In the drawings each bracket is shown formed with a vertical slot 9 which passes over a bolt 10 upon the lawn mower frame, whereby the bracket can be raised, lowered or swung in a vertical plane. The upturned ends of the rear cross-bar are continued up vertically for some distance and then carried inwardly until they meet so as to form a skeleton back 4, which is detachably and adjustably suspended from the lawn mower handle B by means of a chain 11 secured to the back member 4 and adapted to be engaged with a hook 12 on the underside of the lawn mower handle. The hook can be passed through any of the links of the chain 11, so that the rear end of the collector frame can be adjusted at any desired height.

Arranged to be inserted into the frame from the rear, that is through the skeleton back 4, and having sliding support upon the bottom of the frame is a grass collector pan or receptacle 13, having side walls 14 and a back wall 15. Upon the back wall is a handle 16 whereby the receptacle can be thrust into, or pulled out of, the collector frame; and bridging the side walls is a bail 17, whereby the receptacle can be carried and more freely handled. When the receptacle is thrust into the frame, its front edge will engage the forward cross bar, which will thus form a stop to prevent the receptacle from being slid forwardly beyond the forward end of the frame. As a means for holding the pan securely within the frame a spring 18 is provided upon the inner side of one of the side members in position to be engaged by the side of the pan.

In operation the collector is attached to the lawn mower by passing the rods 7 through the horizontal members of the brackets 8, which can be adjusted to the requisite height and angle, and hooking the chain 11 over the hook 12 at the requisite height to bring the pan into horizontal position. The collector is then ready to receive the cut grass. When it is desired to remove the grass, the pan 13 can be withdrawn from the collector frame without disturbing the adjustment of the frame to the lawn mower. And the pan, when emptied, can be replaced in the same way. Thus a very convenient means is provided for receiving, removing and emptying the grass without detaching the collector frame from the lawn mower. Furthermore, by reason of the adjustable connection between the rear of the collector frame and the handle of the lawn mower, the rear end of the collector can be raised or lowered according to the needs of the operator or the slope of the ground. A tall man would usually wish to adjust the handle B of the lawn mower higher up than would a shorter man, and in such case the chain attachment can be lengthened so that the collector pan will remain horizontal. This adjustment is made possible by reason of the pivotal connection between the front of the collector frame and the lawn mower.

I claim as my invention:

1. The combination with a lawn mower and its handle, of a grass collector frame pivotally connected at its front with the lawn mower and detachably and adjustably suspended at its rear from the lawn mower handle, said frame having front and rear cross-bars, a skeleton back, and a bottom plate extending from the rear cross-bar to the front cross-bar, and a pan having sliding support upon the bottom plate and removable through the skeleton back.

2. The combination with a lawn mower and its handle, of a grass collector frame pivotally connected at its front with the lawn mower and detachably and adjustably connected at its rear with the lawn mower handle, said frame having front and rear cross bars and a bottom plate extending from the rear cross bar forwardly under the forward cross-bar, and a pan having sliding support upon the bottom plate, said front cross-bar forming a stop in position to be engaged by the front of the pan when the pan is slid forward upon the bottom plate.

3. The combination with a lawn mower and its handle, of a grass collector comprising a frame pivotally connected at its front with the lawn mower and adjustably connected at its rear with the handle thereof, said frame having side and bottom members, and a receptacle slidably supported upon said bottom member and having yielding engagement with one of said side members.

In testimony whereof I affix my signature in the presence of two witnesses.

WILBUR J. RICHARDSON.

Witnesses:
ARTHUR P. LOTHROP,
H. SMITH.